Jan. 28, 1964    M. GUIOT    3,119,941
STEP BY STEP MOTOR

Filed Dec. 10, 1959    5 Sheets-Sheet 1

INVENTOR
MAURICE GUIOT
By
Wenderoth, Lind + Ponack
Attys.

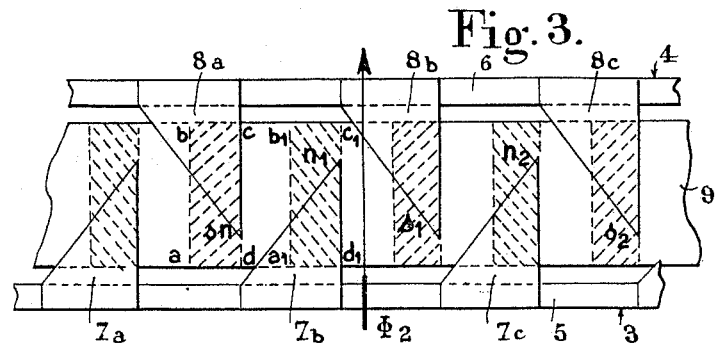
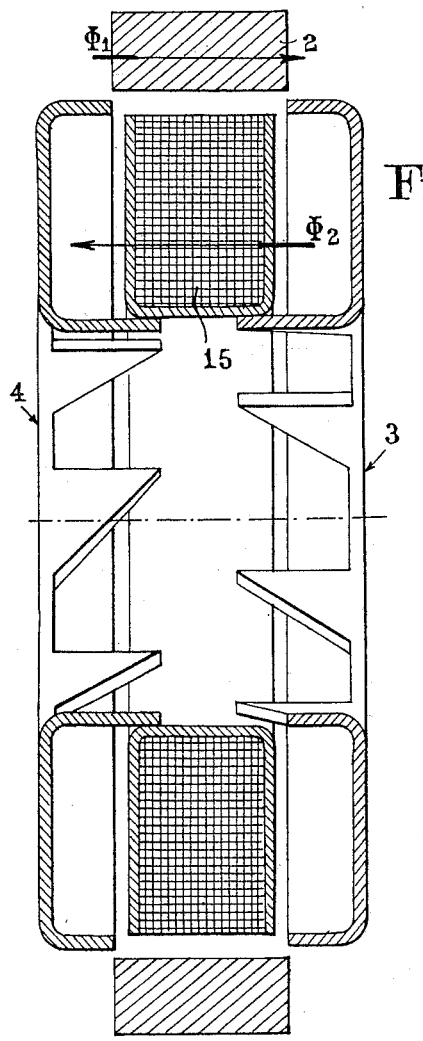
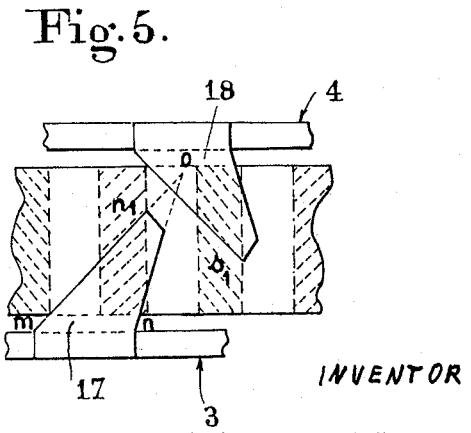

Jan. 28, 1964    M. GUIOT    3,119,941
STEP BY STEP MOTOR
Filed Dec. 10, 1959    5 Sheets-Sheet 3
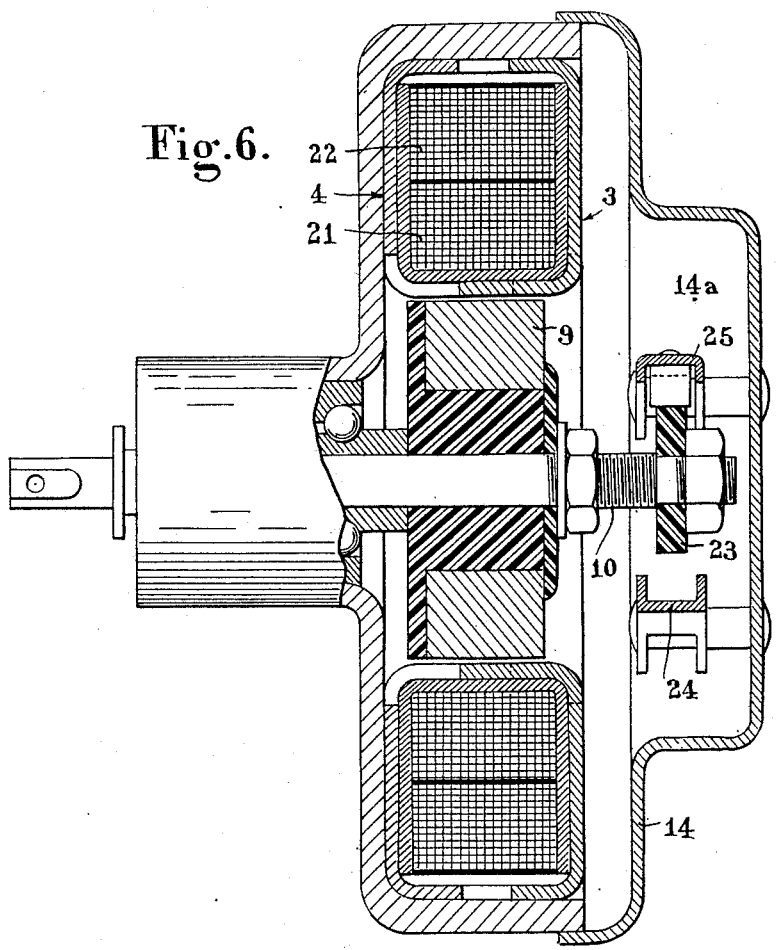
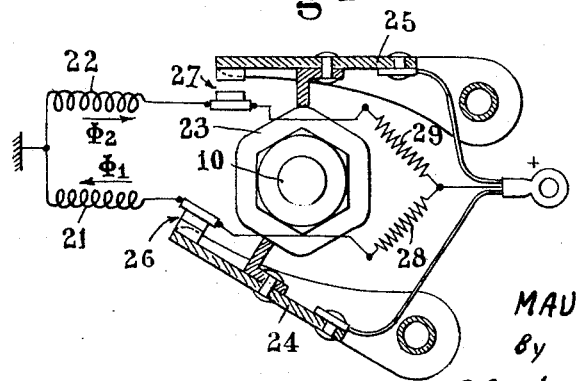
INVENTOR
MAURICE GUIOT
By
Wenderoth, Lind & Ponack
Attys.

Jan. 28, 1964   M. GUIOT   3,119,941
STEP BY STEP MOTOR
Filed Dec. 10, 1959   5 Sheets-Sheet 4

INVENTOR
MAURICE GUIOT

Jan. 28, 1964   M. GUIOT   3,119,941
STEP BY STEP MOTOR
Filed Dec. 10, 1959   5 Sheets-Sheet 5

INVENTOR
MAURICE GUIOT
BY
Wenderoth, Lind + Ponack
Attys.

United States Patent Office 3,119,941
Patented Jan. 28, 1964

3,119,941
STEP BY STEP MOTOR
Maurice Guiot, Paris, France, assignor to Berex
Establishment, Vaduz, Liechtenstein
Filed Dec. 10, 1959, Ser. No. 858,800
Claims priority, application France Apr. 9, 1959
5 Claims. (Cl. 310—49)

The present invention relates to step by step motors and more particularly to a step by step motor energized either by pulses of same or alternately opposite polarities, or by oscillations.

It is the object of this invention to provide a step by step motor comprising an armature or rotor consisting of an annular magnet of ferrite or like magnetic material having an even number of alternate north-south poles along its periphery, at least one annular field winding disposed coaxially to said armature, an annular magnetic circuit surrounding said field winding, said magnetic circuit comprising two transverse plates and longitudinal pole pieces equal in number to said armature poles and disposed at spaced angular intervals about the armature axis between said field winding and said annular magnet, said pole pieces consisting of extensions bent at right angles which are attached alternately to said transverse plates of the magnetic circuit, said pole pieces having the form of identical right-angled triangles wherein one side of the right angle, or transversal side, is perpendicular to the longitudinal axis of the motor and has a length equal to a pole pitch of the armature, the other side of the same right angle, or longitudinal side, being parallel to the longitudinal axis of the motor, whereas the hypotenuses of the pole pieces pertaining to a same plate are parallel to one another and the hypotenuses of the two groups of pole pieces are inclined symmetrically to the longitudinal axis.

With the above-defined pole piece configuration and arrangement the step by step motor of this invention will constantly start in the same direction without requiring any auxiliary means therefor.

On the other hand, this motor provides a relatively high output torque for relatively low power inputs.

The step by step motor according to this invention may be energized by means of pulses of same polarity or pulses having alternately opposite polarities. In this case it operates as a highly efficient rotary relay adapted to function without any maintenance for an unlimited time period, under the most exacting conditions imposed to remote control systems. In this case, the pulses emitted from any suitable generator will be transformed into an identical or proportional number of revolutions of a receiver, irrespective of the duration of each pulse and without any risk of misadjustment or mechanical wear and tear, for the relay according to this invention does not require the usual ratchet wheels, pawls or springs as in hitherto known systems.

If the step by step motor is to be energized with pulses of same polarity, it comprises in addition a ferrite premagnetizing annular magnet disposed coaxially to the field winding and adapted permanently to generate a flux opposite to that generated by the pulses.

In this case it will act as a rotary polarized relay characterized by the advantage of being capable of driving a receiver or output member providing an opposite reaction torque when the relay is de-energized, the stress on the shaft being compensated by the magnetic attraction of the permanent magnet.

When oscillations are fed to the step by step motor of this invention, it operates as a single-phase synchronous motor starting instantaneously and always in the same direction.

In order to afford a clearer understanding of this invention and of the manner in which the same may be carried out in practice, a few typical forms of embodiment thereof will now be described with reference to the accompanying diagrammatic drawings forming part of this invention.

In the drawings and by way of example only;

FIGURES 2 and 3 are fragmentary developed views showing the stator during two opposite phases of the magnetization.

FIGURE 4 is a longitudinal section showing the component elements of the stator according to a modified form of embodiment of the motor.

FIGURE 5 is a fragmentary developed view showing a modified form of embodiment of the stator pole pieces.

FIGURE 6 is a longitudinal section showing a modified form of embodiment of the motor of this invention, wherein the armature or rotor revolves continuously.

FIGURE 7 is an elevational view showing a mechanical device for controlling the energization of the field windings.

Figure 1:
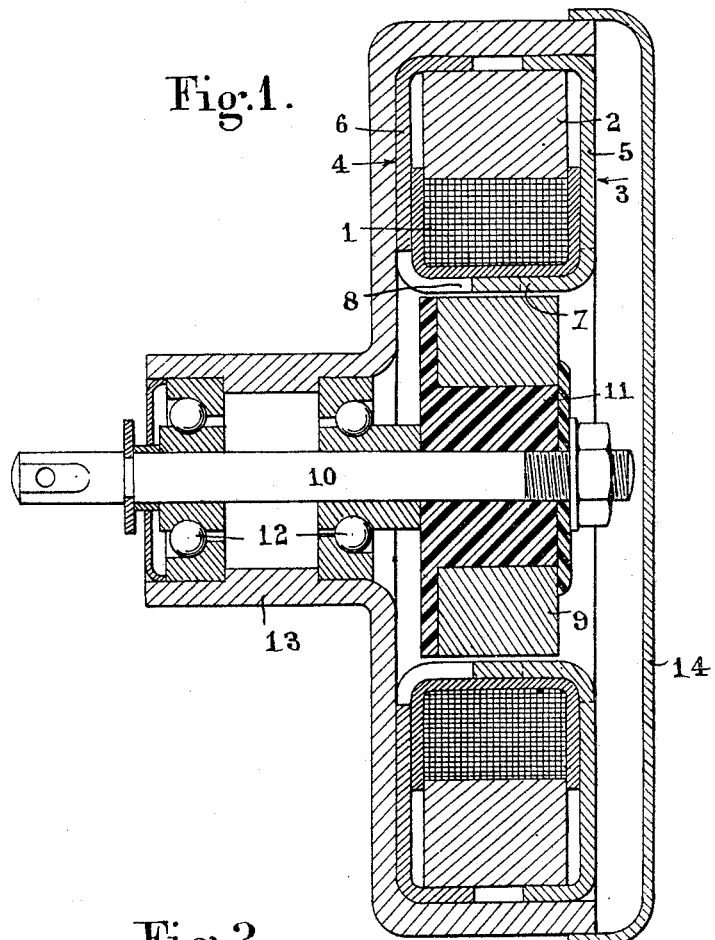
FIGURE 1 is a longitudinal section illustrating the arrangement of the step by step motor of this invention.

Referring first to FIG. 1 of the drawings, the step by step motor illustrated therein comprises a stator consisting essentially of an annular field winding 1, a permanent coaxial magnet 2 magnetized in the axial direction and two magnetic half-circuits 3, 4 surrounding the magnet 2 and the winding 1.

The magnetic half-circuits 3, 4 may be obtained by punching and bending ingot iron strip material in a press. Each half-circuit 3, 4 comprises a transverse plate 5, 6 having longitudinal pole-pieces forming extensions 7, 8 bent at right angles.

These pole-pieces 7, 8 are imbricated in one another and their arrangement will be set forth more in detail presently with the description of the motor operation.

The armature or rotor comprises a permanent annular magnet 9 magnetized in the radial direction and formed along its outer periphery with an even number of alternate north-south poles. This magnet is made preferably, as well as the fixed magnet 2, from a ferrite-type material known under the trade name of "Ferroxdure," having a great stability and being nearly completely insensitive to de-magnetizing fields, so that it is capable of operating during a practically unlimited time period without demagnetization.

The magnet 9 is secured on the armature shaft 10 by means of a hub 11 molded directly on the magnet in an injection-molding process, according to the known process.

The armature shaft 10 is mounted in a pair of ball-bearings 12 of the automatic play take-up type in order to be unaffected by temperature variations and to preclude any risk of jamming.

This assembly is mounted in a case 13 of non-magnetic material in order properly to position the armature with respect to the field magnetic circuits 3 and 4.

A pressed cover 14 fits on this assembly for protection and sealing purposes.

Figure 2:
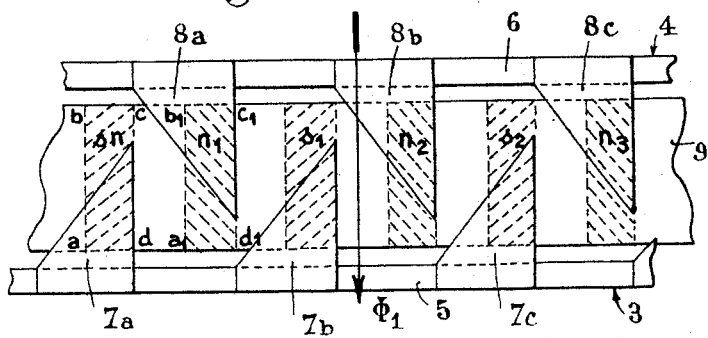

FIGS. 2 and 3 show the developed surface of the armature gap, the armature comprising the multi-pole magnet 9 made of alternate poles $n_1$, $s_1$, $n_2$, $s_2$ . . . underlying the pole pieces 7a, 7b, 7c, 8a, 8b, 8c, of substantially triangular configuration.

These pole pieces consist of extensions projecting from and attached to the plates 5 and 6 of the aforesaid magnetic half-circuits 3 and 4 (see FIG. 1); they are polarized, in the absence of pulses in the field winding 1, by the flux $\phi_1$ generated by the permanent magnet 2.

Thus, all the triangular pole pieces of the upper magnetic half-circuit 4 receive a "south" polarization and all the triangular pole pieces of the symmetric half-circuit 3 receives a "north" polarization.

Under these conditions it is clear that to comply with the principle of maximum potential energy, the "north" poles of the armature as defined by a theoretical rectangular surface $a_1$, $b_1$, $c_1$, $d_1$, etc., will place themselves under a triangular projection or extension of the "south" polarized stator in order to keep the magnetic resistance to a minimum in the magnetic gap or, otherwise stated, to cover the area $a_1$, $b_1$, $c_1$, $d_1$ with the maximum surface of a pole finger.

On the other hand, it will be seen that the adjacent pole $a$, $b$, $c$, $d$ of the armature, which is designated by the symbol "$sn$" is a south pole and that this pole tends to be pushed at $c$ by the same pre-magnetized triangular "south" finger, and attracts as set forth hereinabove the north pole designated by the symbol $a_1$, $b_1$, $c_1$, $d_1$. This point $c$ will become the point of attraction when the flux is reversed.

The shape of the pole pieces $7a$, $7b$ . . . $8a$, $8b$ . . . is determined with due consideration for the fact that their width at the base of the magnetic field half-circuit 4, for example, must be equal to $cc_1$, that is, twice the width of a pole $n_1$ or $s_2$, etc. In the case of a cylindrical armature having 2P poles, the width $cc_1$ will be a length equal to the circumference of the magnet divided by 2P, and $bc = b_1c_1$.

Theoretically, the line representing the hypotenuse of the right-angled triangle corresponding to a pole finger will be obtained by connecting diagonally the point $c$ to the point $d_1$, and point $d$ to point $c_1$, these diagonals being inclined symmetrically so that all the hypotenuses of the triangular fingers of circuit 3 will be parallel and symmetrical relative to those of the circuit 4.

In practice, these right-angled triangles are slightly shortened so that the two magnetic half-circuits 3 and 4 will not contact each other at the vertices of the pole fingers, and a certain gap is maintained between the vertices of the pole fingers. This gap may be for example as small as 1 millimeter (.04") but this value may be varied considerably if it is desired to change the impedance of the pulse circuit.

An important requirement is that the hypotenuses of the right-angled triangles constituting the pole pieces be inclined alternately in opposite directions as shown in the developed view of the gap surface, and that the width of the triangular fingers be constantly equal to a pole pitch of the rotor.

In FIG. 3 it will be seen that as a consequence of the reverse energization resulting from a D.C. pulse in the field winding the flux $\phi_1$, due to the permanent magnet of the stator, is cancelled and replaced by the reverse flux $\phi_2$.

At this time, the magnetic half-circuit 4 has a "north" polarization and the same applies to all the triangular fingers carried thereby, whereas the other half-circuit 3 has a "south" polarization.

Thus, the south pole bound by the surface $a$, $b$, $c$, $d$, is repelled by the half-circuit 3 at $d$ (FIG. 2) and attracted at the angle $c$ by the half-circuit 4 having a north polarization for the time being. Therefore, this pole will occupy the position $a$, $b$, $c$, $d$ of FIG. 3, the south pole $sn = abcd$ being positioned under the pole piece $8a$ having a north polarization in the position of minimum reluctance, whereas the pole $n_1$ ($a_1$, $b_1$, $c_1$ and $d_1$) attracted by the triangular finger $7b$ having a south polarization in the half-circuit 3 will also slip to the right and occupy the position shown in FIG. 3.

The originality of the arrangements contemplated herein resides in the fact that immediately as the emission of the pulse having produced the flux $\phi$ is completed, the conditions shown in FIG. 2 are restored, with the pre-magnetization flux $\phi_1$, thus causing another step of an amplitude of one pole pitch to the right to reproduce the conditions shown in FIG. 2, with the difference that now the pole $s_1$ is substituted for $s_2$, $n_1$ for N $n_2$, and so forth.

It is clear that under these conditions the operation of the relay takes place step by step, with the specific feature that the emission of one pulse will cause a slipping movement corresponding to one pole pitch, and that the breaking of the pulse causes through $\phi_1$ the slipping of another pole pitch also in the same direction.

This result is obtained only by providing pole pieces in the form of triangular fingers, whereby accurately defined positions are obtained in the inoperative condition, while ensuring in the absence of any pulse emission a magnetic coupling torque between $\phi_1$ and the multi-pole magnet 9 of the rotary armature.

More particularly, it will be readily understood by anybody conversant with the art that the direction of the pulse flux $\phi_2$ must necessarily be opposite to the direction of $\phi_1$, and that if the energization coil were connected by mistake in the direction corresponding to $\phi_1$ the armature would remain stationary.

The motor illustrated in FIG. 1 may be used as a rotary step by step relay adapted to operate under any desired pulse frequencies while maintaining the same direction of step by step motion of the armature or rotor. In the case of an armature consisting of an annular, twelve-poled magnet of a ferrite-type material known under the trade name of "Ferroxdure," the emission of a pulse generating the flux $\phi_2$ will cause the armature to slip through the angular extent of one pole pitch, that is, one-twelfth of a revolution. Similarly, the end of the pulse emission permits of restoring the flux $\phi_1$ and the armature will again slip through one pole interval, that is, through another twelfth of a revolution, always in the same direction of rotation.

When the pulse rate is accelerated, the armature rotation increases gradually and this armature may even behave as a self-starting synchronous motor if the energizing coil is fed with single-phase, 50-cycle current.

Thus, a particular advantage results from the step by step motor of this invention; as a matter of fact, during the complementary rotation of a second pole pitch subsequent to the end of a pulse, the magnet 9 may be used for generating a pulse within an auxiliary winding disposed coaxially to the field winding. This pulse may be utilized in turn for various purposes and notably for controlling another polarized rotary relay of same type.

The above-mentioned polarized rotary relay is suitable for controlling from a distance devices adapted to occupy a number of predetermined angular positions, such as rotary switches, with a minimum current consumption for the pulse generation, for the extremely accurate positioning resulting from the special arrangement of the pole pieces in the form of triangular fingers makes it possible to dispense with all antagonistic torques and detent positioning means usually required for the remote control of rotary switches and tuners.

In the modified form of embodiment illustrated in FIG. 4, all the space available between the half-circuits 3 and 4 (the same as those shown in FIG. 1) is occupied by the energizing coil 15 in order to provide a high-torque, very powerful relay for industrial applications. In this case the magnet 2 may be located externally of the circuit, the flux $\phi_1$ permitting of polarizing the half-circuits 3 and 4 as in the case of FIG. 1.

With this arrangement the flux $\phi_2$ can be closed between the two half-circuits 3 and 4 without exerting any non-reversible de-magnetizing influence on the magnet 2.

On the other hand, if desired, the annular "Ferroxdure" magnet 2 may be replaced by magnets in the form of small plates secured externally of the magnetic circuits 3 and 4, in order to create a flux $\phi_1$ permitting the equivalent pre-magnetization of the field circuit.

FIGURE 5 illustrates a modified form of embodiment of the pole pieces incorporated in the magnetic circuits 3 and 4. The pole pieces 17, 18 have a triangular configuration $mno$ with the vertex $o$ truncated. The medians drawn from the vertices $o$ are inclined symmetrically relative to the longitudinal axis of the motor. In this case the poles $n_1, s_1 \ldots$ are held against movement under the pole pieces 17, 18 in a well-defined position for which the common surface area is maximum.

If the polarization through the magnet 2 is eliminated the relay may be operated as a step by step motor by means of pulses of alternately opposite directions.

It will be readily understood that with the step by step of this invention any problem concerning the remote control of switches or rotary tuners, as well as the servo control of devices for the remote programming of operations, remote-control of indication and information, can be solved without difficulty, the energization of the field winding being discontinued if desired by a switch responsive to the rotational movement of the relay.

This relay supplied with single-phase, 50-cycle current from the mains will start instantaneously and take its synchronism speed, that is 500 r.p.m. in the case of a twelve-pole armature.

In the case of other new applications it is also possible to substitute a coil insulated relative to the energizing circuit 1 for the stationary magnet 2 of FIG. 1, this coil behaving like the secondary of a transformer, in order to release pulse signals of variable frequency through thyratron or transistor means, and to adjust the speed of the motor energized from a D.C. source such as dry batteries, storage accumulators, etc.

The applications of this pulse-synchronized step by step relay afford a practical solution to the known problems of multiple control means synchronized from a distance through the medium of a pulse emitter mounted as a self-oscillator.

The motor according to this invention may be adapted to control servo-mechanisms fed with low-voltage D.C. and notably to electromotors used in auxiliary automotive equipment such as the motors for driving heater fans, fuel pump, windshield-wiper, etc.

In applications of this character what is sought is not an accurate positioning of the motor between two pulses but on the contrary a continuous, smooth rotation.

A motor of this character is illustrated in FIGS. 6 and 7 of the drawings. The two magnetic half-circuits 3, 4 surround a pair of coaxial field windings 21, 22 adapted to produce magnetic fields of opposite directions.

The pressed cover 14 is formed with a central cap 14a receiving a mechanical distributor for switching the energizing current. This device comprises essentially a cam 23 rigid with the shaft 10 of armature 9.

The cam 23 is engaged by movable arms 24, 25 of a pair of mechanical contact-breakers 26, 27 (FIG. 7). The fixed contacts of these breakers 26, 27 are connected to the field windings 21 and 22, respectively. These field windings 21, 22 are wound in opposite directions in the stator, so that the magnetic fields $\phi_1$ and $\phi_2$ produced by these windings when energizing current flows therethrough will be opposed to each other.

Assuming that the armature magnet comprises twelve poles, by securing a six-boss cam 23 endwise of the shaft 10, this cam will cause a contact breaker to lift or open through a 30-degree angle and to close also through a 30-degree angle.

By disposing the two contact breakers 26, 27 thirty degrees apart in their case, the distributor 24—27 will supply energizing pulses alternately to the field windings 21 and 22.

It will be noted that to compensate the pulse delay effect resulting from the magnetic hangover of the saturated field circuit, a centrifugal automatic advance device of any type used in known automotive distributor may be used.

Finally, since a detrimental spark resulting from the self-induction effect can be expected at each circuit breaking, this invention contemplates the use of spark arresters 28, 29 in the form of a resistors whereby the spark is definitely eliminated each time the circuit is broken in this distributor, to ensure a long useful life to the contacts. The value of resistors 28, 29 is high enough to prevent the moderate currents $i_1$ and $i_2$ flowing not only therethrough but also through the windings 21 and 22 when the contact breakers 26 and 27 are open from detrimentally affecting the efficiency of the main pulses the values $I_1$ and $I_2$ of which may be up to five or six hundred times greater than $i_1$ and $i_2$.

The motor thus constructed operates exactly like the one described with reference to FIGS. 1 to 3, each pulse causing the rotary armature or rotor to move through the angular extent of one pole pitch in a constant direction.

The motor according to this invention, while operating practically under constant-torque conditions, has a power output, measured on the shaft, which varies with the speed, the latter depending in turn on the energizing voltage, for a predetermined magnetic circuit.

In automotive equipment a very satisfactory efficiency can be obtained at variable speeds by using either a multicontact switch whereby the motor of this invention is connected to the storage battery cells so that each contact provides a voltage two volts higher than the voltage of the preceding contact, so that six speeds from 2 to 12 volts can be obtained without any external losses, or better still a rheostat.

Under certain conditions of use of the circuit comprising the two field windings 21, 22, one may be led, for either utilizing magnets having a relatively great number of poles, or reducing the diameter of these motors, to shift the windings 21, 22 relative to the armature. In this case the two magnetic half-circuits 33 and 34 are pressed according to the conventional arrangement illustrated in FIGS. 8 and 9.

Thus, in this arrangement the two magnetic half-circuits are each provided with P poles cut in the form of triangular fingers according to the principle of this invention. A difficulty arises in cutting these poles for on one of the stator-forming assemblies the poles are secured to the core by their vertices, and are therefore particularly liable to break.

Figure 8:
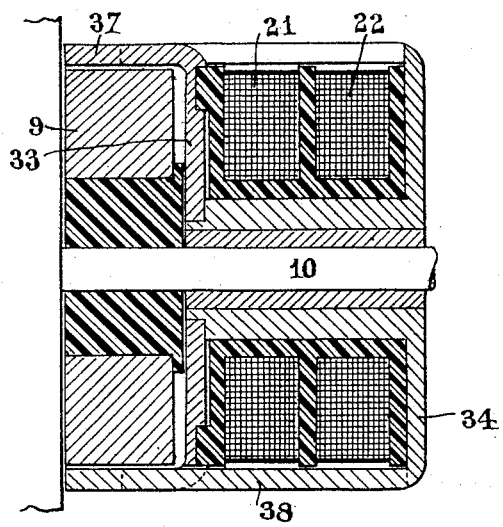
FIGURE 8 is a longitudinal section of the motor wherein the field windings are coaxial and adjacent to one another.

As a matter of fact, it will be seen in FIG. 8 that the pole fingers 37 rigid with the magnetic half-circuit 33 should normally be attached thereto through the vertex of the triangle, as shown in chain-dotted lines.

To avoid this drawback, the shape of the pole fingers 37 and 38 has been amended in the manner illustrated. These fingers comprise on one-half of their length L a triangular contour according to this invention and on the other half a rectangular contour.

Since the width at the base of the triangular pole fingers is equal to one pole pitch P, the width of the rectangular extension thereof will be $P:2$.

Figure 9:
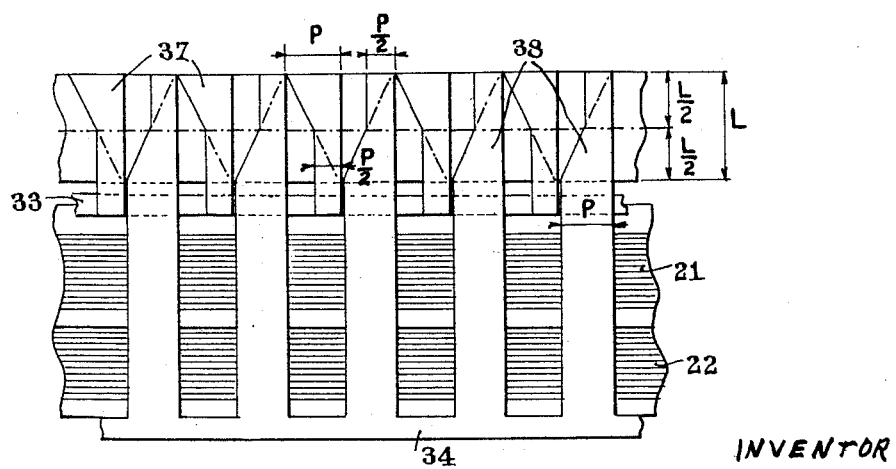
FIGURE 9 is a developed view showing the magnetic circuit of the stator.

The step by step motor according to FIGS. 8 and 9 operates exactly like the one described with reference to FIGS. 1 to 3, the magnet 3 being replaced by the additional field winding 22.

Figure 10:
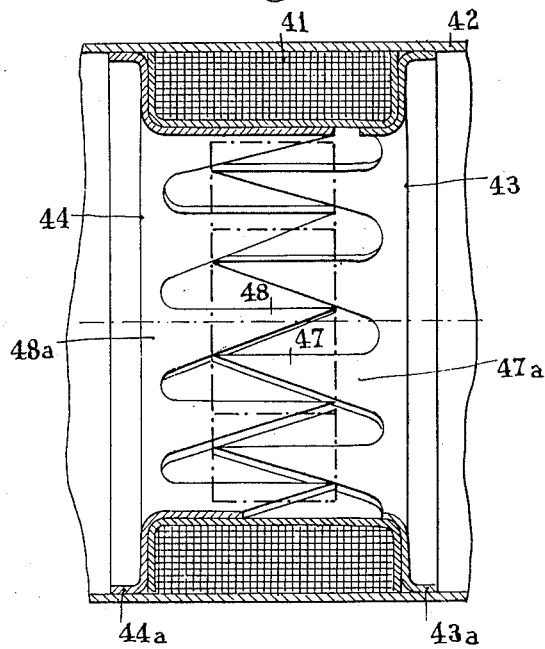
FIGURE 10 is a longitudinal section showing another modified form of embodiment of the stator.
Figure 11:
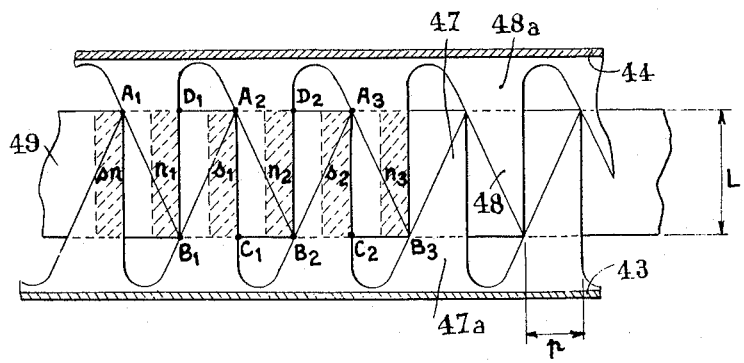
FIGURE 11 is a fragmentary developed view of the stator of FIG. 10.

The motor illustrated in FIG. 10 is adapted to be energized by means of pulses of alternate polarities, or oscillations. This stator magnetic circuit comprises an external tube 42 and two armatures 43, 44 between which the field winding 41 is wound, as shown.

The armatures 43 and 44 comprise pressed cylindrical elements 43a, 44a constituting with the outer case-forming steel tube 42 the surfaces of the magnetic joints. With his arrangement, an accurate mounting, characterized by a complete absence of play and by a smooth, silent operation, is obtained.

In this form of embodiment the pole pieces 47 and 48 themselves are also in the form of right-angled triangles such as $B_1$, $C_1$, $A_2$ and $A_1$, $D_1$, $B_1$ having their bases $A_1$–$D_1$ and $B_1$–$C_1$ of a length equal to one polar pitch $p$ of the armature or rotor. In this example, the pole pieces have lug extensions 47a, 48a the only function of which is to provide the necessary connection with the armatures 43 and 44.

In order to reduce reluctance variations to a minimum between the poles, the vertices $A_1$, $A_2$, $A_3$ ... $B_1$, $B_2$, $B_3$ ... are common to both pole pieces 47 and 48 so that these pole pieces contact each other by their tips or vertices. The length of the sides of the pole pieces which are parallel to the motor axis, that is, the sides $D_1$, $B_1$, $C_1$, $A_2$, etc. is equal to the width L of rotor 49.

As a consequence of the closing of the magnetic circuit at points $A_1$, $A_2$, $A_3$ ... $B_1$, $B_2$, $B_3$ ..., the stator impedance is reduced and therefore the motor can be operated at higher frequencies.

Of course, many modifications and alterations may be brought to the few forms of embodiment shown and described herein by way of example, without however departing from the spirit and scope of the invention as set forth in the appended claims.

What I claim is:

1. A synchronous motor comprising, a stator having an annular field winding,
   a permanent coaxial magnet magnetized in axial direction and
   two magnetic half circuits coupled with the magnet and the annular field winding,
   a rotor rotatable in said stator comprising
   a permanent annular magnet,
   said rotor having a hub of insulating material flanged radially to overlie one side of said annular magnet, and an armature shaft extending through said hub and having
      retaining means for locking said hub and said shaft in corotation including an insulating disk carried on said shaft and extending radially outwardly of said hub to overlie a portion of the opposite side of said annular magnet,
   said annular magnet having an even number of north and south poles in alternate positions around the periphery thereof,
   said two magnetic half circuits comprising two end plates and longitudinal pole pieces equal in number to said rotor poles,
   said pole pieces each consisting of a pole plate substantially perpendicular to a radius of the rotor,
   and pole plates from one end plate alternating with pole plates from the other end plate of the other end plate of the magnetic circuit,
   said pole pieces having the same shape and being asymmetrical in the direction of the periphery of the rotor,
   the asymmetry being in the same direction in each pole piece.

2. A synchronous motor comprising, a stator comprising an annular field winding,
   a permanent coaxial magnet magnetized in axial direction
   and two magnetic half circuits coupled with the magnet and the winding,
   a rotor rotatable in said stator comprising
   a permanent annular magnet,
   said rotor having a hub of insulating material flanged radially to overlie one side of said annular magnet, and an armature shaft extending through said hub and having
      retaining means for locking said hub and said shaft in corotation including
         an insulating disk carried on said shaft and extending radially outwardly of said hub to overlie a portion of the opposite side of said annular magnet.

3. A synchronous motor as claimed in claim 1 in which each pole plate is in the shape of a right triangle with the base at the end plate from which the pole plate projects and with the side parallel to the axis of rotation of the rotor, and with the hypotenuse on the same side of each pole piece, the pole pieces on each end plate being spaced around the end plate at distances equal to the length of the base of a pole plate.

4. A synchronous motor as claimed in claim 1 in which the apex of each triangular pole piece formed between the hypotenuse and the side terminates short of the pole piece adjacent thereto.

5. A synchronous motor as claimed in claim 1 in which the apex of each triangular pole piece formed between the hypotenuse and the side touches the pole piece adjacent thereto.

References Cited in the file of this patent

UNITED STATES PATENTS

| 2,000,600 | Loeffler | May 7, 1935 |
| 2,105,514 | Welch | Jan. 18, 1938 |
| 2,981,855 | VanLieshout et al. | Apr. 25, 1961 |

FOREIGN PATENTS

| 504,800 | Great Britain | May 1, 1939 |
| 530,439 | Great Britain | Dec. 12, 1940 |
| 1,166,984 | France | June 30, 1958 |